United States Patent
Miller et al.

(10) Patent No.: US 12,116,935 B2
(45) Date of Patent: Oct. 15, 2024

(54) METHODS OF CONTROL FOR MANAGEMENT OF HOT FUEL

(71) Applicant: General Electric Company, Schenectady, NY (US)

(72) Inventors: Brandon W. Miller, West Chester, OH (US); Robert Jon McQuiston, Evendale, OH (US); Stefan Joseph Cafaro, Chapel Hill, NC (US); Eric Richard Westervelt, Niskayuna, NY (US); Michael A. Benjamin, West Chester, OH (US); Joel M. Haynes, Loveland, OH (US); Hejie Li, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/310,386

(22) Filed: May 1, 2023

(65) Prior Publication Data

US 2023/0265796 A1    Aug. 24, 2023

Related U.S. Application Data

(62) Division of application No. 17/350,932, filed on Jun. 17, 2021, now Pat. No. 11,668,241.

(51) Int. Cl.
  *F02C 7/22*  (2006.01)
  *F02C 7/224* (2006.01)
  *F02C 9/28*  (2006.01)

(52) U.S. Cl.
  CPC ............... *F02C 7/22* (2013.01); *F02C 7/224* (2013.01); *F02C 9/28* (2013.01); *F05D 2220/32* (2013.01); *F05D 2240/35* (2013.01); *F05D 2260/20* (2013.01)

(58) Field of Classification Search
  CPC ................................. F02C 7/22; F02C 7/224
  See application file for complete search history.

(56) References Cited

U.S. PATENT DOCUMENTS

| | | |
|---|---|---|
| 3,925,002 A | 12/1975 | Verdouw |
| 4,716,719 A | 1/1988 | Takahashi et al. |
| 6,931,858 B2 | 8/2005 | Venkataramani et al. |
| 7,784,267 B2 | 8/2010 | Tobita et al. |
| 9,512,805 B2 | 12/2016 | Snyder |
| 9,556,794 B2 | 1/2017 | Falempin et al. |
| 9,732,670 B2 | 8/2017 | Joshi et al. |
| 2008/0141972 A1 | 6/2008 | Morrison et al. |

(Continued)

FOREIGN PATENT DOCUMENTS

| | | | |
|---|---|---|---|
| GB | 392444 | 5/1933 | |
| JP | 11210492 A | * 8/1999 | ............ F02C 7/224 |
| JP | 2013199925 A | * 10/2013 | ............ F02C 7/224 |

OTHER PUBLICATIONS

English translation of JP-11210492-A (Year: 1999).*
English translation of JP-2013199925-A (Year: 2013).*

*Primary Examiner* — Scott J Walthour
(74) *Attorney, Agent, or Firm* — Klarquist Sparkman, LLP

(57) ABSTRACT

A gas turbine engine fuel supply system can include a fuel delivery system, a thermal management system, a fuel manifold, and one or more sensors that identify one or more fuel parameters. A fuel control system adjusts parameters of the fuel based on data received from the sensors.

19 Claims, 10 Drawing Sheets

(56) References Cited

U.S. PATENT DOCUMENTS

| | | |
|---|---|---|
| 2011/0108639 A1 | 5/2011 | Hicks |
| 2012/0167580 A1 | 7/2012 | Roesler |
| 2013/0014514 A1 | 1/2013 | Romig et al. |
| 2013/0036722 A1 | 2/2013 | Hashenas et al. |
| 2014/0318134 A1 | 10/2014 | Popovic |
| 2015/0100220 A1* | 4/2015 | Swann ............. F02C 9/28 701/100 |
| 2015/0375868 A1 | 12/2015 | Smith et al. |
| 2017/0030266 A1 | 2/2017 | Cerny et al. |
| 2017/0167382 A1 | 6/2017 | Miller et al. |
| 2017/0167391 A1 | 6/2017 | Demelas |
| 2018/0073478 A1 | 3/2018 | Noguchi |
| 2018/0179952 A1 | 6/2018 | Peter et al. |
| 2019/0128186 A1 | 5/2019 | Cerny et al. |
| 2019/0153953 A1 | 5/2019 | Niergarth et al. |
| 2019/0257247 A1 | 8/2019 | Pal et al. |
| 2020/0355119 A1 | 11/2020 | Lubomir |

\* cited by examiner

METHODS OF CONTROL FOR MANAGEMENT OF HOT FUEL

CROSS REFERENCE TO RELATED APPLICATION

This application is a divisional of U.S. patent application Ser. No. 17/350,932, filed Jun. 17, 2021. The prior application is incorporated herein by reference in its entirety.

FIELD

The present subject matter relates generally to fuel delivery systems for gas turbine engines.

BACKGROUND

Gas turbine engines typically include a compressor section, a combustor section, and at least one turbine section. The compressor compresses air, which is mixed with fuel and channeled to the combustor. The mixture is then ignited generating hot combustion gases. The combustion gases are channeled to the turbine, which extracts energy from the combustion gases for powering the compressor, as well as producing useful work to power a load, such as an electrical generator, or to propel an aircraft in flight.

The properties of the fuel delivered to the combustor can affect the efficiency of the system. In addition, during operation, the fuel can undergo significant property changes, which further complicates fuel delivery and combustion. As such, improvements in controlling fuel delivery in gas turbine engines are desirable.

DETAILED DESCRIPTION

Figure 1:
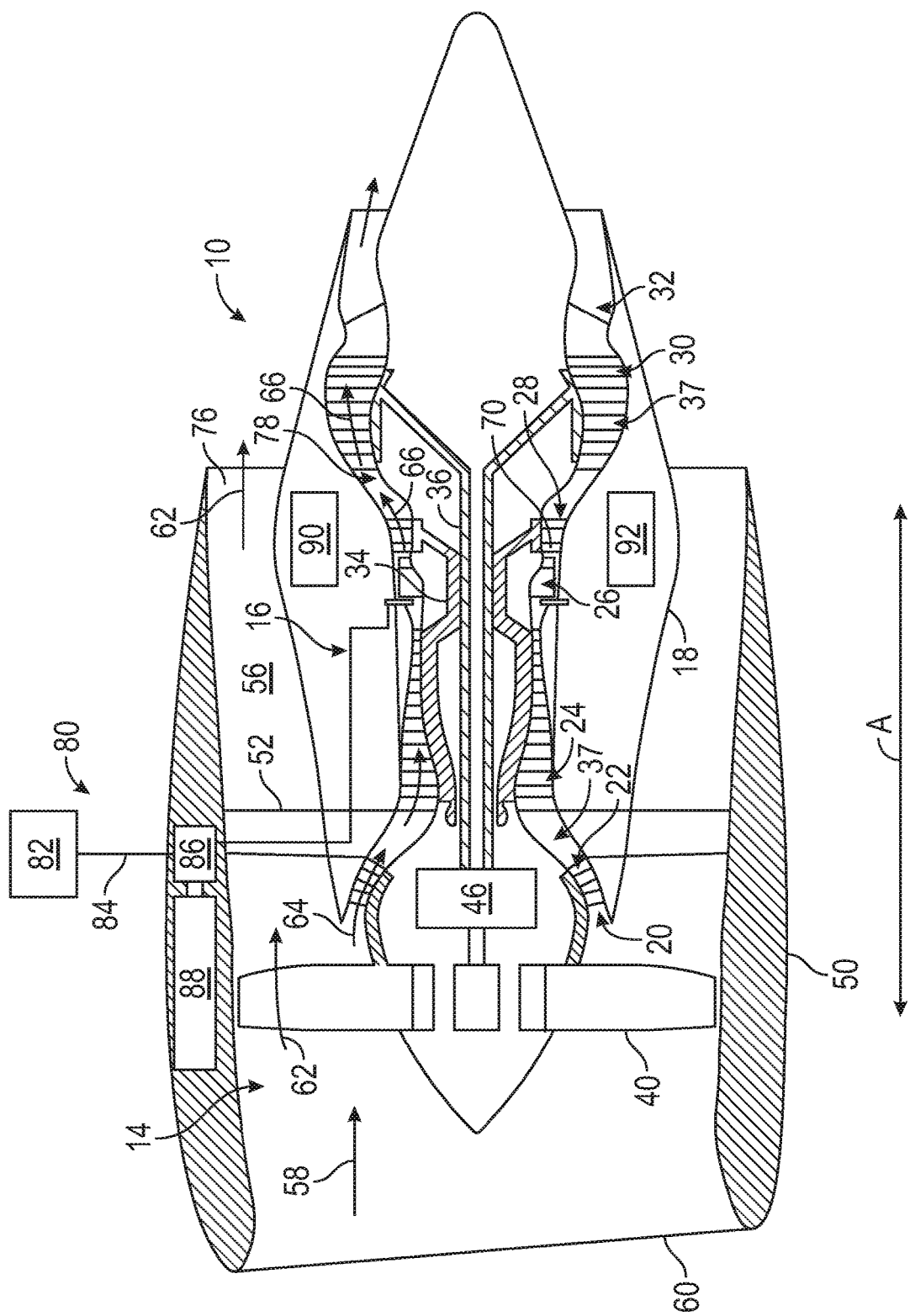
FIG. 1 is a schematic, cross-sectional view of an exemplary gas turbine engine according to various embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, "fluid communication" between two or more elements refers to a configuration in which fluid can be communicated between or among the elements and does not preclude the possibility of other structures, such filters, flow meters, and/or valves (which may restrict the transfer of fluid between the elements in at least some conditions), disposed between such elements.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section, turbine section, and exhaust nozzle section together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through one or more stages 70 of the HP turbine 28 and into an inlet 78 of the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Further, the exemplary turbofan engine 10 includes a fuel delivery system 80 providing a flow of fuel to the combustion section 26 of the turbofan engine 10. The fuel delivery system 80 generally includes a fuel source 82, a plurality of fuel lines 84, and a fuel pump 86. The fuel source 82 may be, e.g., a fuel tank positioned within a fuselage or one or more wings of an aircraft including the turbofan engine 10.

Additionally, the exemplary turbofan engine 10 can include an accessory gearbox 88 (which may be driven by, e.g., the HP system of the turbofan engine 10 or the LP system of the turbofan engine 10, through one or more drive members extending through the strut 52). The accessory gearbox 88 is, for the embodiment shown, positioned within the nacelle 50 of the turbofan engine 10, and the fuel pump 86 is coupled to, and driven by, the accessory gearbox 88. Moreover, the one or more fuel lines 84 extend from the fuel source 82, to the fuel pump 86, and from the fuel pump 86 to one or more fuel nozzles within the combustion section 26.

Further, still, the exemplary turbofan engine 10 depicted includes a thermal management system 90 and a lubrication oil system 92, schematically shown in FIG. 1. The thermal management system 90 may generally be configured to transfer heat from a heat source of the turbofan engine 10 to a heat sink of the turbofan engine 10 utilizing a thermal transfer bus flowing a thermal transfer fluid therethrough. The lubrication oil system 92 may be configured to provide lubrication oil to one or more bearings or sumps within the turbomachine 16 to facilitate rotation of one or more components, manage thermals of certain components (such as the bearings), etc.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., one spool, two spools, three spools), etc. Further, in certain exemplary embodiments, aspects of the present disclosure may further apply to any other suitable aeronautical gas turbine engines, such as an unducted engine, a turbojet engine, a turboshaft engine, a turboprop engine, etc. Additionally, in still other exemplary embodiments, the exemplary turbofan engine 10 may not be configured as an aeronautical gas turbine engine, and instead may be configured as an industrial gas turbine engine (e.g., utilized for power generation), a nautical gas turbine engine, etc.

As indicated above, the fuel delivery system 80 delivers fuel from a fuel source, through a plurality of fuel lines to one or more nozzles within the combustion section. The properties of the fuel when delivered to the nozzles have a significant influence on combustion efficiencies. Management of these properties of the fuel can provide significant improvements in stable fuel distribution through the nozzles and engine controllability.

Figure 2:
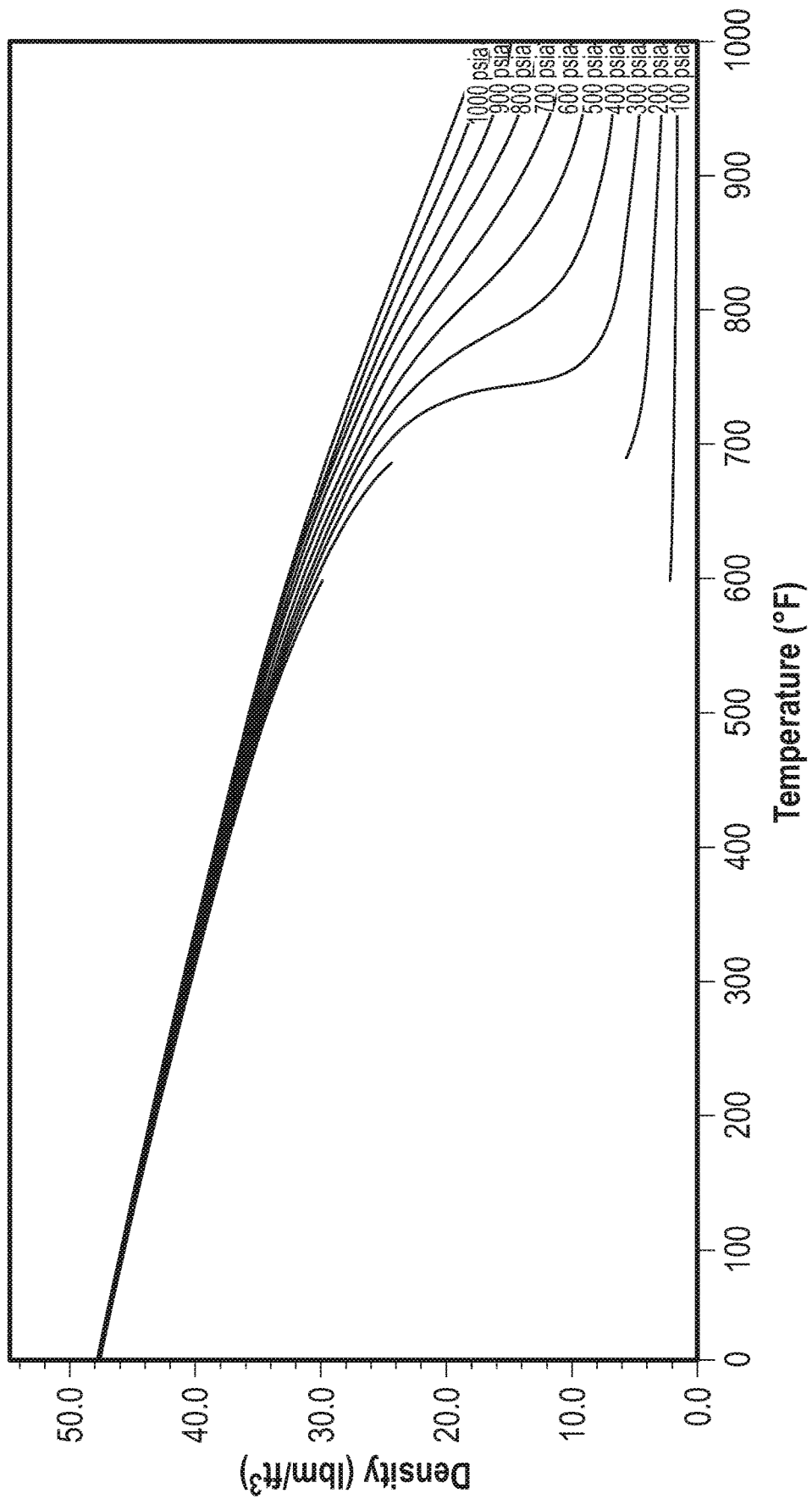
FIG. 2 illustrates an exemplary property table for a fuel.

Gas turbine engines can operate on a wide variety of fuels. As used herein, the term "jet fuel" refers to any fuel suitable for use in turbine engines in aviation. Two commonly used fuels for commercial aviation include Jet A and Jet A-1. FIG. 2 illustrates an exemplary property table for a fuel (e.g., fuel analog dodecane). As shown in FIG. 2, the density of fuels begins to experience a rapid transition above a certain temperature. This may vary depending on the fuel, but in the case of FIG. 2 the density begins to experience a more rapid transition above about 500° F. As discussed below, because of this rapid density change at these temperature ranges of fuel, it can be desirable to control the fuel temperature and/or pressure to avoid these transitions areas.

Figure 3:
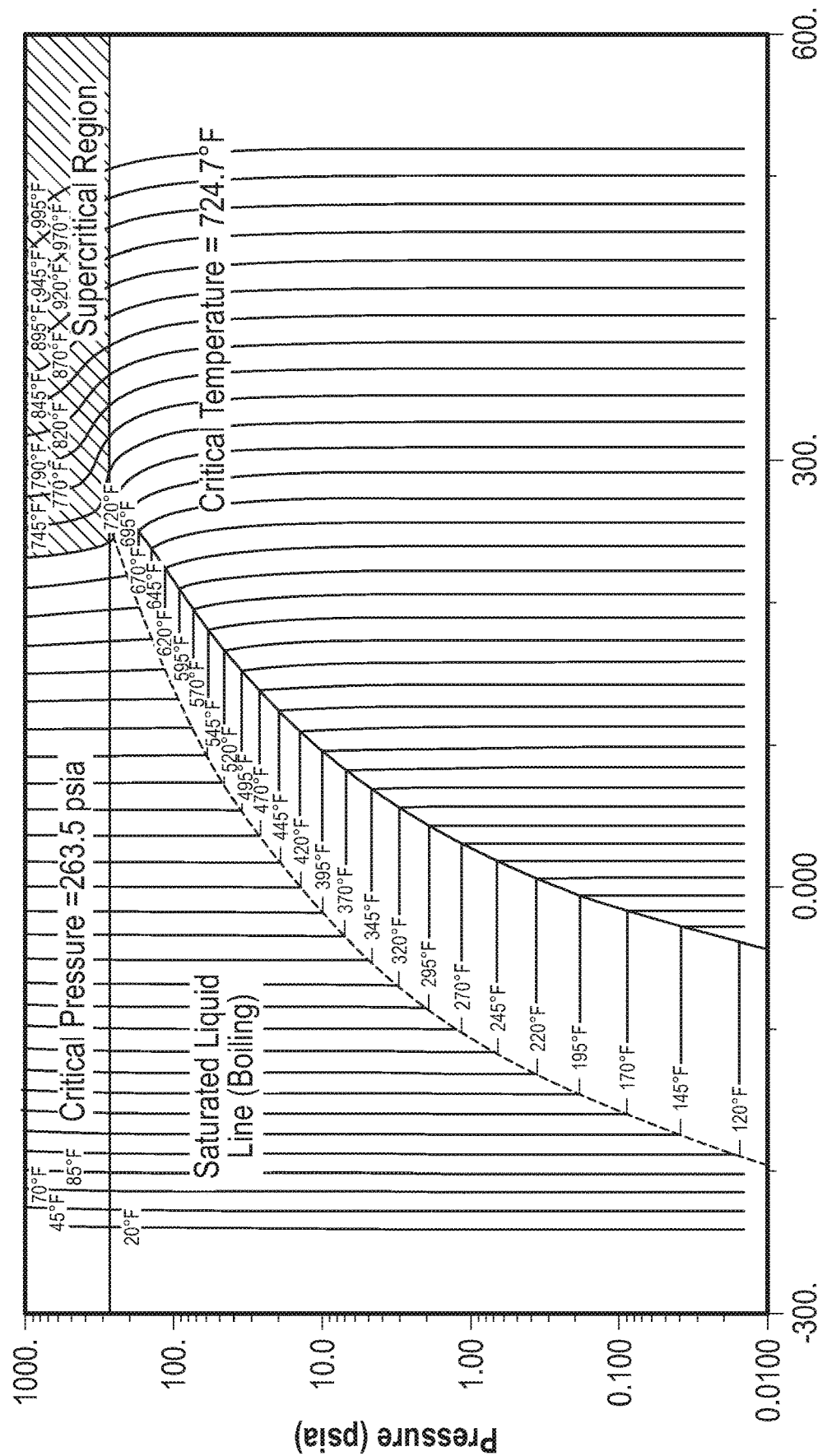
FIG. 3 illustrates another exemplary property table for a fuel.

FIG. 3 illustrates another exemplary property table for a fuel (e.g., fuel analog dodecane). This table will vary depending on the specific jet fuel, but FIG. 3 illustrates an exemplary saturated line in which the fuel will begin to boil.

Figure 14:
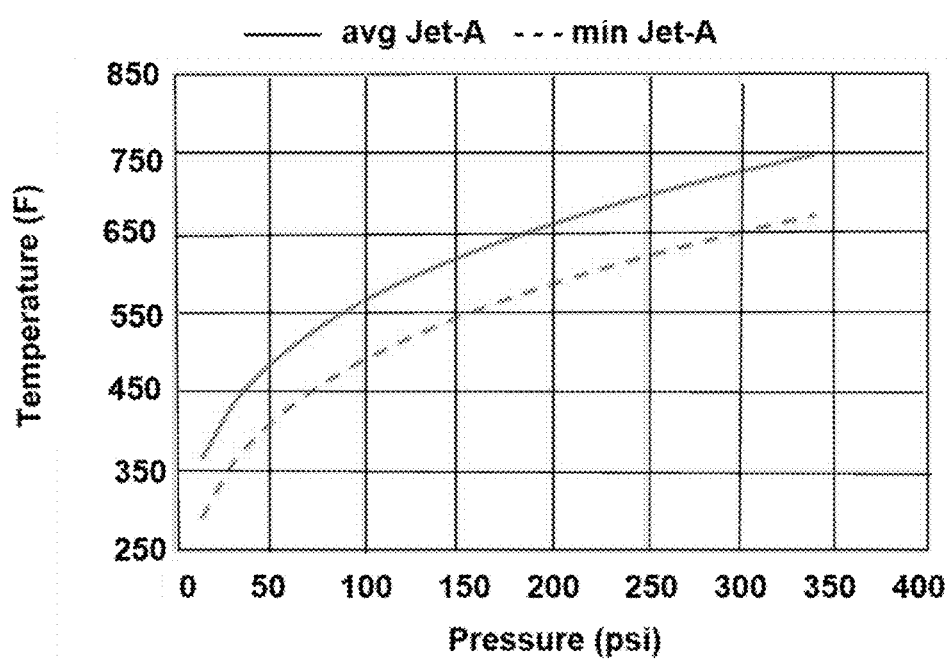
FIG. 14 illustrates another exemplary property table for a fuel.

Similarly, FIG. 14 illustrates an exemplary fuel boiling curve for Jet-A, including an average Jet-A boiling curve and a minimum Jet-A boiling curve. In many cases, boiling of fuel is undesirable. For example, as discussed below it can be desirable to avoid boiling of fuel in the manifold and/or in the fuel nozzle, and in some embodiments, as discussed below, the system can adjust the temperature and/or pressure of the fuel to avoid boiling of the fuel.

In some embodiments, boiling and other state changes of fuel can be avoided by adjusting the pressure, temperature, and/or density of the fuel to maintain the fuel in a supercritical state. For example, for the fuel type illustrated in FIG. 3, a supercritical pressure is 263.5 psia and a supercritical temperature is 724.7°.

Figure 4:
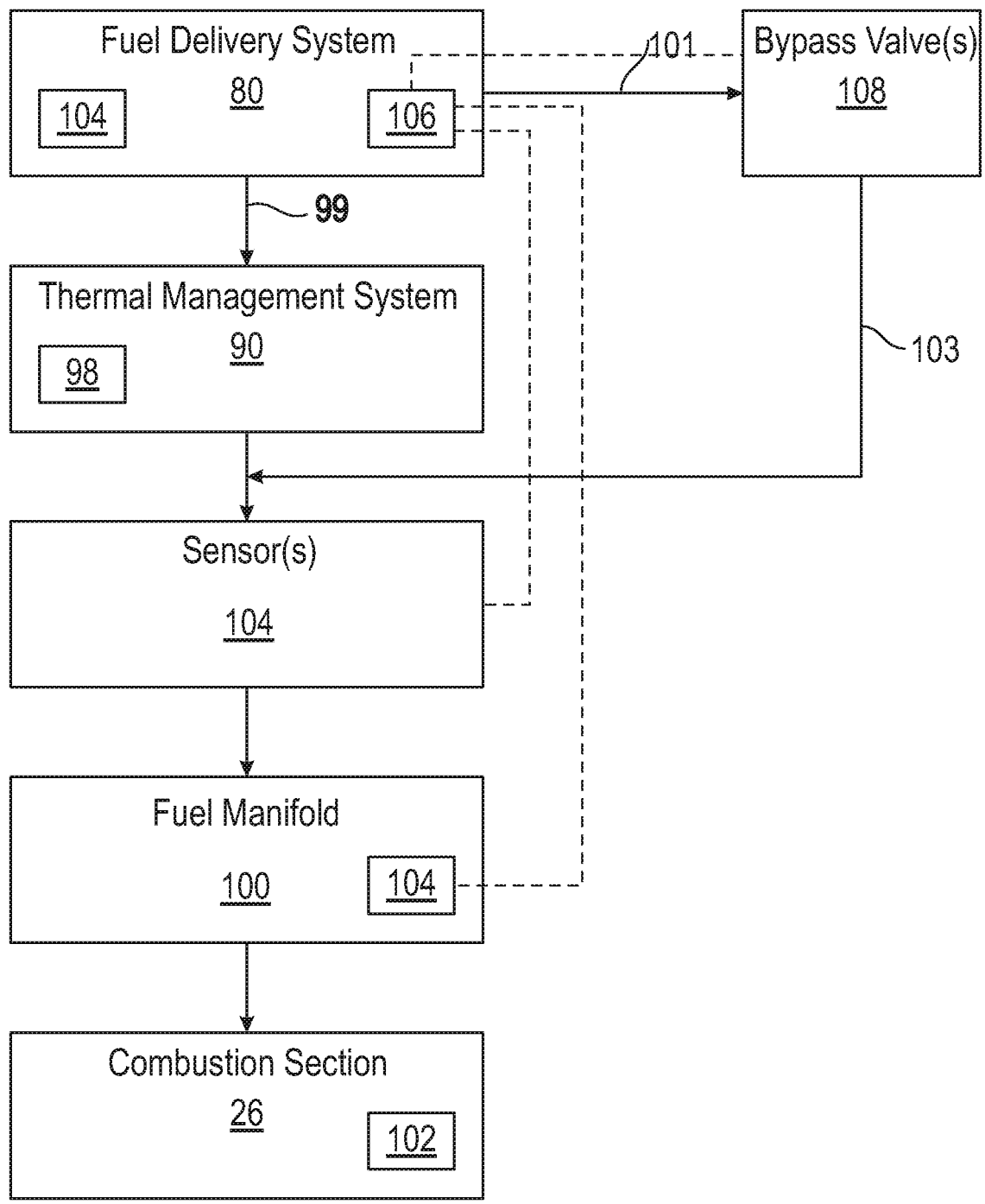
FIG. 4 is a schematic illustration of a fuel delivery system and other engine components in accordance with an embodiment of the present disclosure.

In the embodiment illustrated in FIG. 4, a system and method of controlling the gas turbine fuel phase is provided. As shown in FIG. 4, a fuel delivery system 80 directs the fuel to a thermal management system 90. As indicated above the thermal management system can be configured to transfer heat from a heat source of the turbofan engine 10 to a heat sink of the turbofan engine 10 utilizing a thermal transfer bus flowing a thermal transfer fluid therethrough. In particular, in operation, the fuel can pass through one or more heat exchangers 98 (along path 99) of the thermal management system 90 to raise the temperature of the fuel before the fuel is delivered to a fuel manifold 100 and, in turn, a plurality of nozzles 102 within the combustion section 26.

As shown in FIG. 4, one or more sensors 104 can be provided in the fuel delivery system, fuel path, and/or within one or more locations within the manifold 100. The sensors 104 can provide data indicative of different parameters of the fuel, including, for example, a temperature, a pressure, and/or a flow rate of the fuel at the location of the sensor 104.

A fuel control system (controller) 106 can receive data from the one or more sensors 104 as shown in FIG. 4, the communication of which is schematically illustrated by dashed lines. It should be understood, the controller can receive data from other locations in FIG. 4 and from elsewhere in the system. Data from sensors 104 can be used individually for determining fuel parameters, or in some cases a plurality of different sensors 104 at different locations can be collectively used to determine changes in the same fuel parameters within the system. Based on the data received at the controller, the controller can be configured to alter a temperature and/or pressure of the fuel. For example, as discussed below, in some embodiments, the temperature of the fuel can be adjusted by increasing or decreasing an amount of heat supplied to the fuel (e.g., by one or more heat exchangers of a thermal management system). In addition, or alternatively, a pressure of the fuel can be increased or decreased within the system (e.g., along the flow path of the fuel by one or more pumps and/or at a fuel nozzle by adjusting a differential pressure of the nozzle).

In some embodiments, the fuel control system 106 can be operably coupled to one or more bypass valves 108 and, in response to data received from the sensor(s) 104, the fuel control system 106 can direct the fuel to the bypass valve 108 (e.g., along path 101) such that the fuel bypasses the thermal management system 90 by directing the fuel along paths 101 and 103 to a location downstream of the thermal management system 90.

In some embodiments, the fuel control system can be configured to bypass the thermal management system 90 when one or more sensors identify a fuel state that is undesirable for the fuel distribution of the turbofan engine.

In one embodiment, the fuel control system can be configured to respond to the identification of an undesirable temperature of the fuel. For example, the fuel control system can be configured to cause the fuel to bypass the thermal management system when one or more sensors indicate that a temperature of the fuel exceeds a temperature designated as undesirable due to a rapid undesirable transition (e.g., the density transition at 500° F. shown in FIG. 2).

Density changes in jet fuel can become more pronounced at higher temperature, such as temperatures between about 500° F. and 800° F. for some jet fuels (FIG. 2). Accordingly, in some embodiments the fuel control system can be configured to cause the fuel to bypass the thermal management system when the temperature exceeds 500° F., 450° F., 400° F., 350° F., or 300° F. In another embodiment, the fuel control system can be configured to cause the fuel to bypass the thermal management system when a temperature of the fuel sensed by the one or more sensors is between 400° F. and 600° F. In this manner, the fuel delivery system, through the fuel control system and communicating sensors, can maintain a temperature of fuel delivered to the nozzles of the fuel manifold in a desired range.

Figure 5:
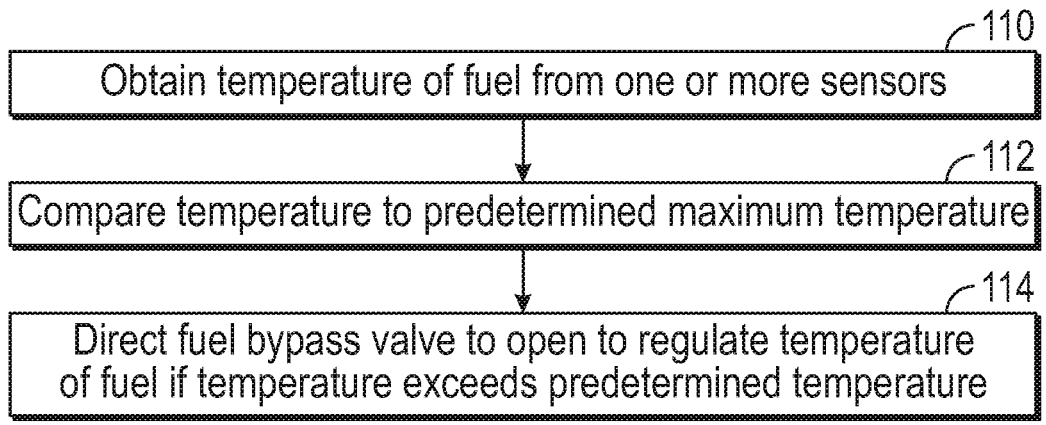
FIG. 5 is a flowchart illustrating an exemplary method of controlling fuel delivery of a gas turbine engine in accordance with an embodiment of the present disclosure.

Thus, as shown in FIG. 5, a method of controlling the properties of fuel delivered to a manifold and/or a plurality of nozzles can comprise the steps of obtaining the temperature of the fuel from one or more sensors 110, comparing the detected temperature(s) to a predetermined maximum temperature 112, and directing fuel to bypass the thermal management system when the detected temperature exceeds the maximum temperature.

In another embodiment, the fuel control system 106 shown in FIG. 4 can be configured to cause the fuel to bypass the thermal management system when a minimum density of the fuel is detected. For example, FIG. 5 illustrates a method of obtaining temperature and pressure data from one or more sensors (step 120), calculating a density of the fuel at the sensor(s) based on the data obtained by the one or more sensors (step 122), comparing the calculated density to a minimum allowable density (step 124), and directing the fuel bypass valve to open (so that the fuel bypasses the thermal management system) if the calculated density is less than a predetermined minimum allowable density (step 26). In one embodiment, the minimum allowable density is a density at which the density of the fuel begins to rapidly transition at higher temperatures. For example, referring to FIG. 2, a minimum allowable density can be between 30 and 40 lbm/fft$^3$, or between 35 and 40 lbm/ft$^3$, such as about 38 lbm/ft$^3$.

In some embodiments, the minimum allowable density can be determined as a percentage of the density of the fuel at 0° F. For example, in some cases, the predetermined minimum allowable density ranges from 70% to 95%, or from 80% to 95%, or from 80%-88% of the density of the fuel as measured at 0° F.

Figure 6:
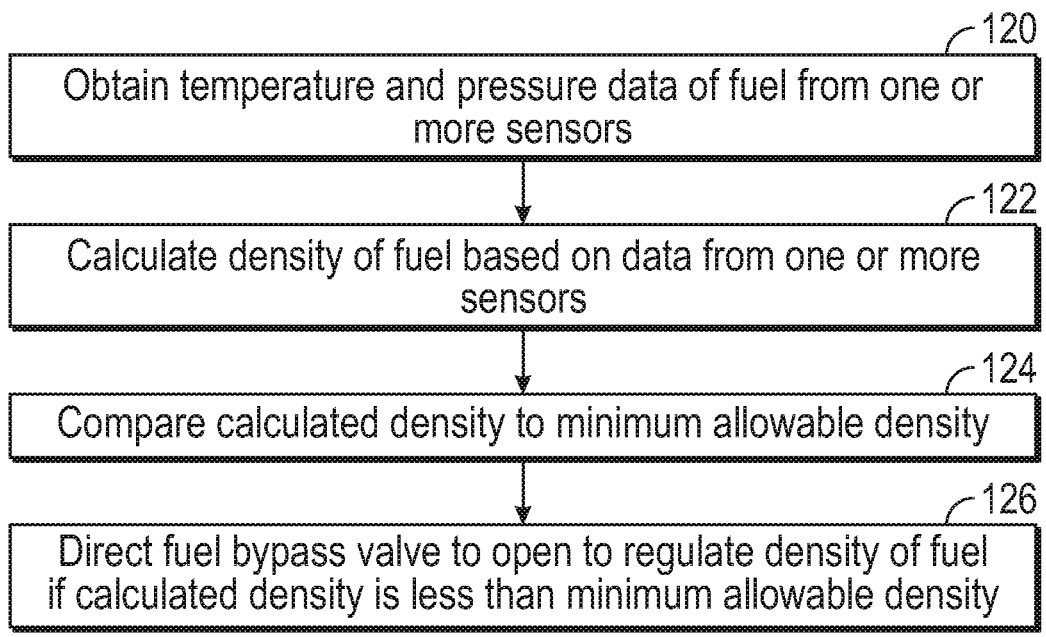
FIG. 6 is another flowchart illustrating an exemplary method of controlling fuel delivery of a gas turbine engine in accordance with an embodiment of the present disclosure.

In another embodiment, the fuel control system 106 shown in FIG. 4 can be configured to cause the fuel to bypass the thermal management system based on a combination of a determined temperature (FIG. 5) and density (FIG. 6). Thus, for example, the fuel control system can be configured to open the bypass valve when the temperature exceeds a predetermined temperature and/or the density is below a predetermined density.

Thus, for example, the fuel control system 106 can be configured to open the bypass valve (or close the bypass valve) when the determined temperature and density of the fuel falls outside of a desired operating range. Referring to FIG. 2, for example, a desired operating range for a density of about 38 lbm/ft$^3$ may require a temperature of less than about 400° F., or, in some embodiments less than about 300°

F. In other cases, the desired operating range can be between about 200° F. and 400° F. In the event that either parameter falls outside the desired range, the fuel control system 106 can be configured to open (or close) the bypass valve so that the fuel bypasses (or enters) the thermal management system.

In some embodiments, in certain flight conditions and/or if the fuel temperature exceeds a predetermined maximum temperature, the system can be configured to open the bypass valve until the triggering flight condition and/or fuel temperature is no longer met.

Figure 7:
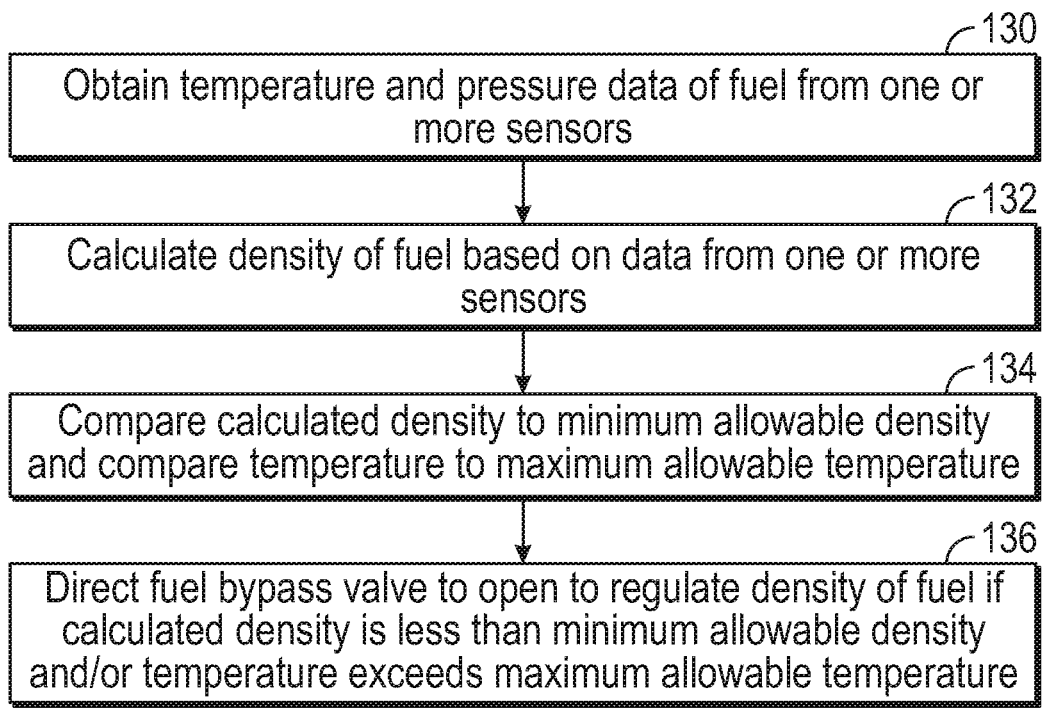
FIG. 7 is another flowchart illustrating an exemplary method of controlling fuel delivery of a gas turbine engine in accordance with an embodiment of the present disclosure.

FIG. 7 illustrates the method described above in which temperature and pressure data is obtained (step 130), density of the fuel is determined (step 132), and the obtained temperature information is compared to a predetermined temperature limit and the determined density is compared to the minimum allowable density (step 134). The fuel control system 106 causes the fuel to bypass the thermal management system when one or both parameters are outside of the desirable operating ranges discussed herein (step 136).

In another embodiment, the fuel control system 106 shown in FIG. 4 can be configured to cause the fuel to bypass the thermal management system when a predetermined change in density of the fuel is detected. As discussed above and shown in FIG. 2, densities of fuel can experience a rapid transition above a certain temperature, such as about 500° F., and identifying a change in density that exceeds a predetermined amount over a particular time period can be an effective approach to identifying the transition of a fuel property into an undesirable range.

Figure 8:
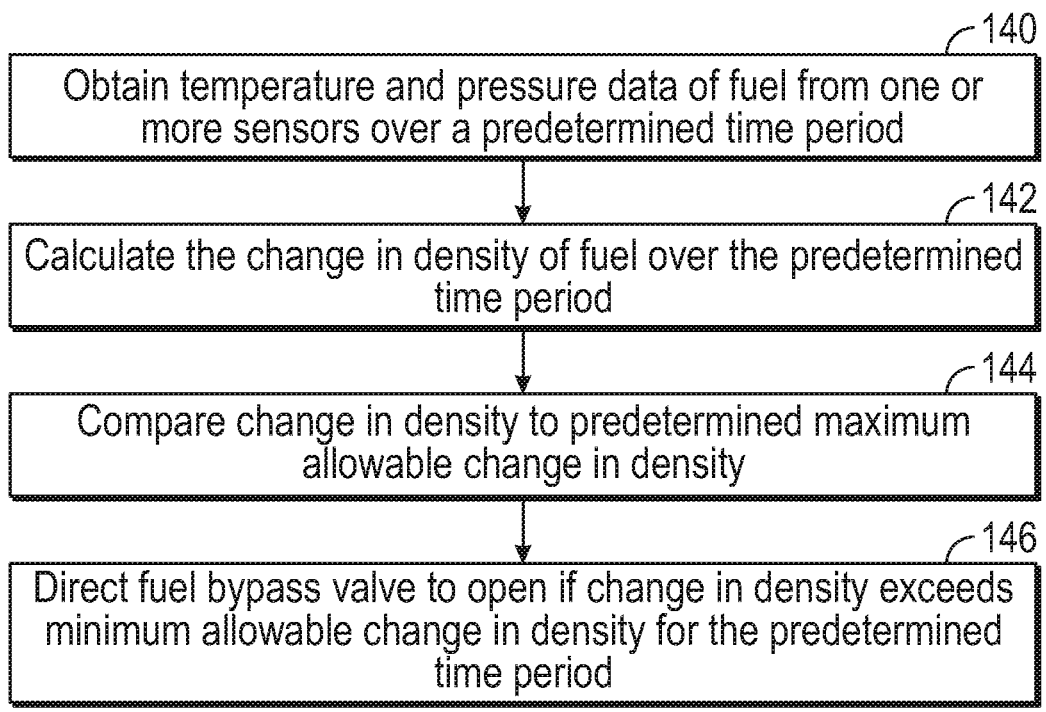
FIG. 8 is another flowchart illustrating an exemplary method of controlling fuel delivery of a gas turbine engine in accordance with an embodiment of the present disclosure.

Referring to FIG. 8, another method of controlling the properties of fuel delivered to a manifold and/or a plurality of nozzles is provided based on the identification of undesirable changes in density of the fuel. As shown in FIG. 8, the method can comprise the steps of obtaining the temperature and pressure parameters of the fuel from one or more sensors over a predetermined period of time (step 140), calculating a change in density over that same period of time (step 142), and comparing the change in density to a predetermined maximum allowable change in density over that period (step 144). If the change in density exceeds the predetermined maximum for the time period, the fuel bypass valve is directed to open to permit the fuel to bypass the thermal management system (step 146).

In yet another embodiment, the properties of the fuel can be further modified (alternatively, or additionally) by adjusting a pressure of the fuel in the system. For example, a fuel pressure can be increased or decreased within the fuel path by controlling one or more pumps accordingly. Alternatively, or in addition, fuel pressures can be adjusted at the fuel nozzles by dynamically controlling the fuel nozzles to alter properties of the fuel at the fuel nozzle.

Figure 9:
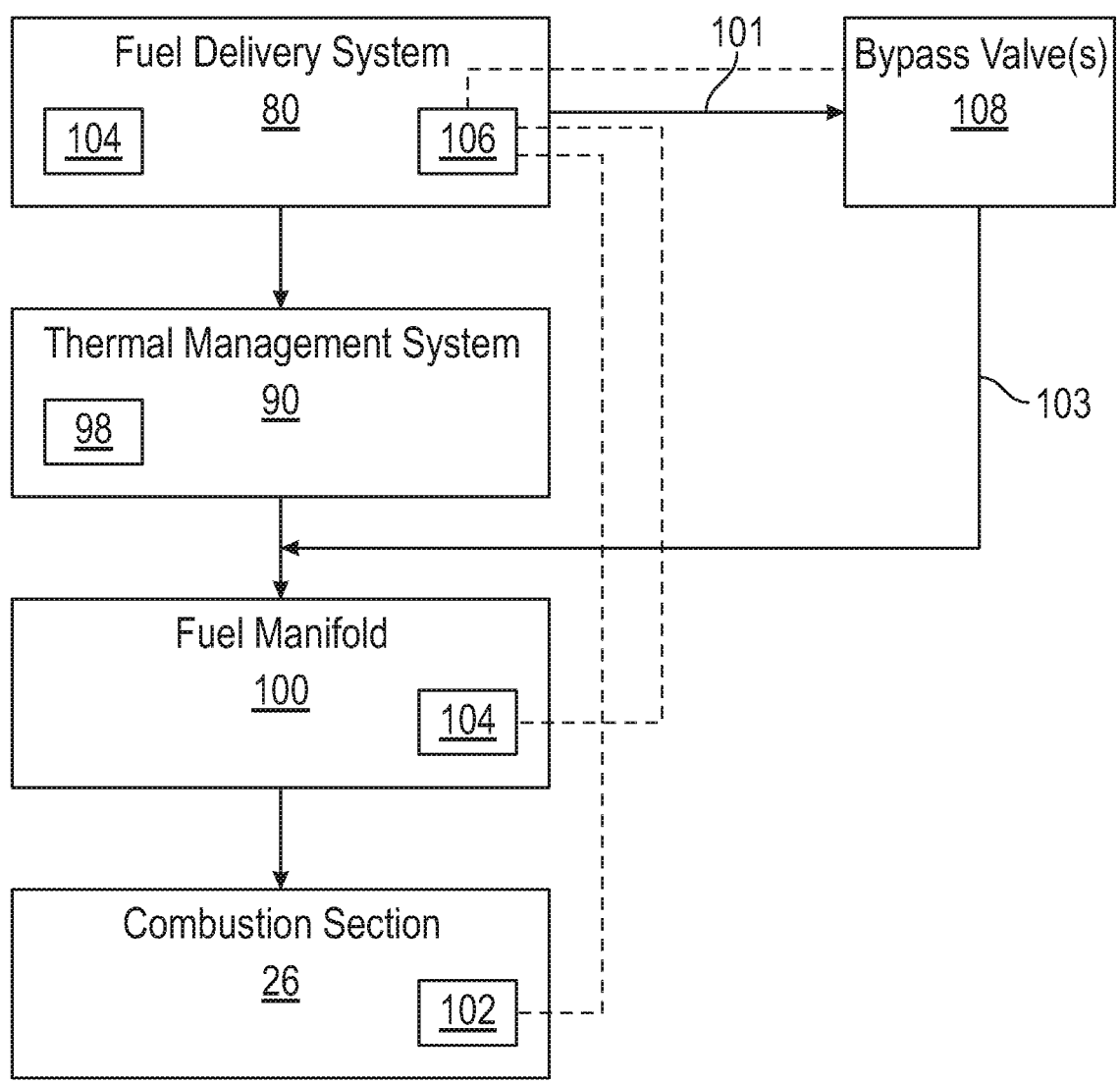
FIG. 9 is a schematic illustration of a fuel delivery system and other engine components in accordance with an embodiment of the present disclosure.

FIG. 9 illustrates another exemplary system and method of controlling the gas turbine fuel phases. Like FIG. 4, FIG. 9 discloses a fuel delivery system 80 that directs the fuel to a thermal management system 90 and/or bypasses the thermal management system if the fuel control system opens bypass valve 108. One or more sensors 104 can be provided in the fuel path (as shown in FIG. 4) and/or within one or more locations within the manifold 100. The sensors 104 can provide data indicative of a temperature, a pressure, and/or a flow rate of the fuel at the location of the sensor 104. The fuel control system 106, in this embodiment, is also in communication with one or more pumps and nozzles 102. Depending on the data from the sensors, the fuel control system can additionally vary a fuel pressure within the system, either by controlling the pumps (e.g., fuel pump 86 of FIG. 1) and/or controlling the nozzle response to adjust one or more of temperature, pressure, and density of the fuel in the nozzles.

Figure 10:
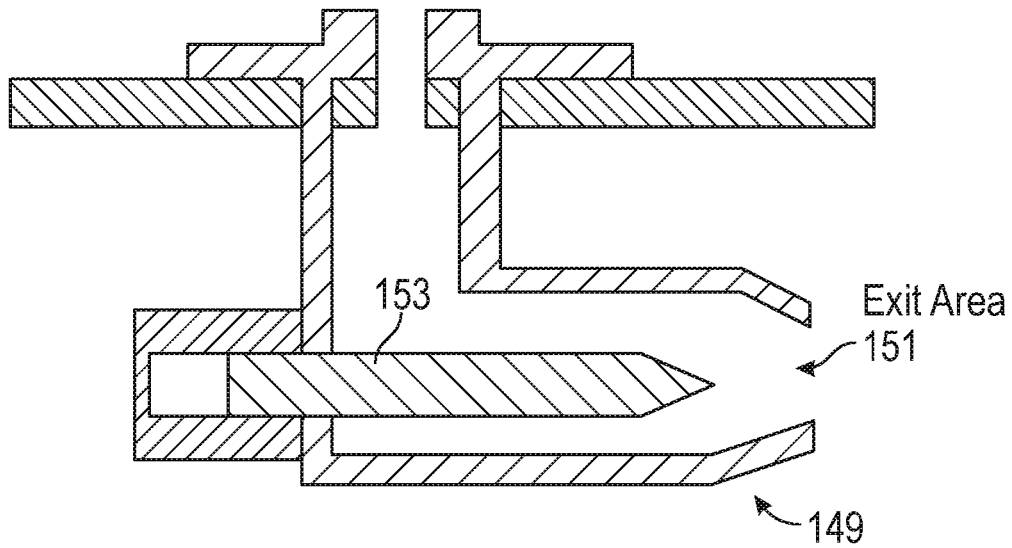
FIG. 10 is a schematic illustration of a variable pressure nozzle.

For example, FIG. 10 illustrates an exemplary variable pressure fuel nozzle 149, which can either passively or actively (e.g., through fuel control system 106) alter a parameter of the fuel at the fuel nozzle. For example, the fuel nozzle can comprise an exit area 151 that can be increased or decreased by moving (actively or passively) a nozzle adjustment member 153 away from or closer to the nozzle exit area 151.

In one embodiment, the variable pressure fuel nozzle can reduce or increase a pressure of the fuel to a predetermined range. In this manner, the variable pressure fuel nozzle can function to affect a pressure of the fuel, either in addition to the bypass valve or separately from the bypass valve. In some embodiments, the variable fuel nozzle can respond to adjust a pressure to increase or decrease a desired density, based on a calculated density and/or calculated density change as described herein.

In another embodiment, a variable fuel nozzle system can be provided by employing a plurality of fuel nozzles that are staged so that one or more groups of nozzles can be independently controlled. For example, one or more valves can be used to vary the number of fuel nozzles in operation at any time. In this manner, pressure can be reduced by enabling more fuel nozzles at one time or reduced by disabling fuel nozzles.

Figure 11:
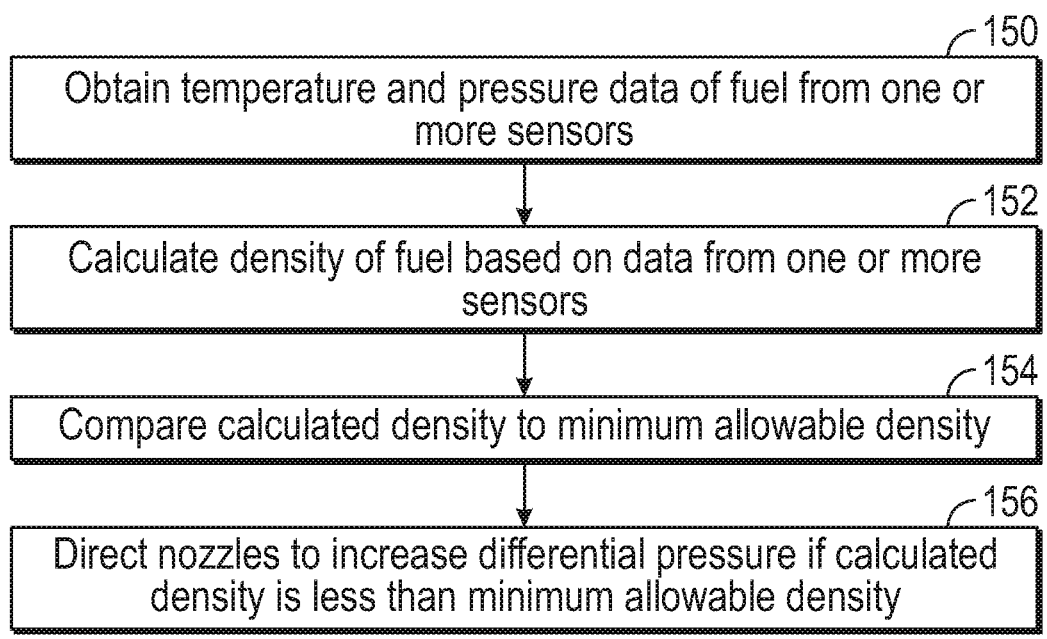
FIG. 11 is another flowchart illustrating an exemplary method of controlling fuel delivery of a gas turbine engine in accordance with an embodiment of the present disclosure.

For example, similar to method described in FIG. 6, FIG. 11 illustrates a method of obtaining temperature and pressure data from one or more sensors (step 150), calculating a density of the fuel at the sensor(s) based on the data obtained by the one or more sensors (step 152), comparing the calculated density to a minimum allowable density (step 154), and changing a nozzle pressure (e.g., by changing an orifice area of one or more nozzles or changing the number of enabled nozzles)to increase a delivery fuel pressure if the calculated density is less than a predetermined minimum allowable density (step 156). Similarly, delivery fuel pressure can be decreased if desired based on a determined condition of the fuel. For example, if the minimum allowable density is 38 lbm/ft$^3$, the nozzle can increase the fuel density at the nozzle when one or more sensor of the system detects a minimum allowable density below 38 lbm/ft$^3$. As indicated in FIG. 9, the nozzles can be controlled by fuel control system 106, which may include one or more high frequency (HF) electrical controllers associated therewith.

In some embodiments, controlling fuel parameters at the nozzles using the associated HF controllers provides additional opportunities for delivering fuel to the nozzles in a desired state. In some embodiments, the desired state of the fuel can be a liquid state as discussed above to avoid changes in fuel parameters when the fuel boils or enters a gaseous state. In other embodiments, however, the desired state of the fuel can be a supercritical state. For example, one method for delivering fuel in this manner can be achieved by delivering the fuel in a supercritical state to the fuel nozzles and adjusting the differential pressure of the fuel nozzle as needed to obtain the desired fuel state and parameters.

Figure 12:
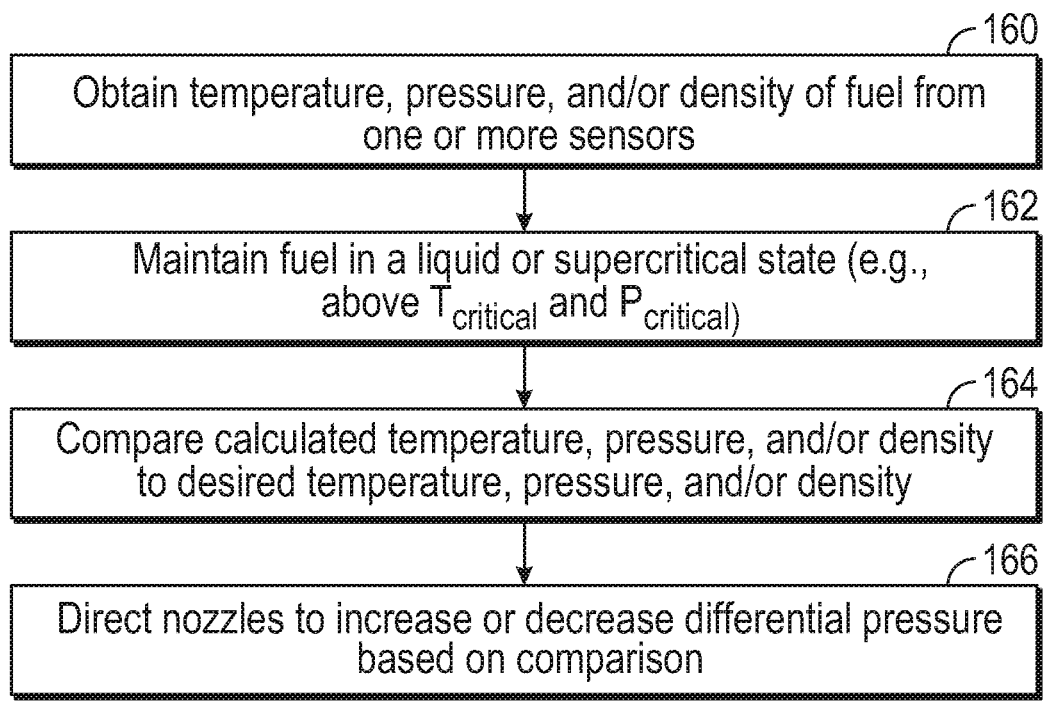
FIG. 12 is another flowchart illustrating an exemplary method of controlling fuel delivery of a gas turbine engine in accordance with an embodiment of the present disclosure.

As shown in FIG. 12, in some embodiments, the fuel control system 106 can obtain temperature, pressure, and/or density information about the fuel from one or more sensors (step 160) and, based on this information, maintain the fuel in a liquid or supercritical state (step 162). To maintain the fuel in the liquid or supercritical state, the fuel control system can modify a pressure and/or temperature of the fuel. For example, to maintain the fuel in the supercritical state, the fuel control system can maintain the fuel above the critical temperature and critical pressure of the fuel. The fuel properties can then be compared to desired fuel properties (step 164) and the fuel dynamics can be managed by increasing the pressure of the fuel along the fuel delivery path, as needed to maintain the fuel in a liquid or supercritical state. In some embodiments, the pressure can be modified by changing a differential pressure of the nozzles as desired (step 166).

Alternatively, or in addition to changing a differential pressure of the nozzles, the system can increase the pressure of the fuel delivery system 80 to maintain the fuel at a temperature and pressure in which the fuel is in a liquid or supercritical state. Thus, the pressure of the fuel can be increased (or decreased) along the fuel path (e.g., through fuel pump 86 or other pumps located at any other location along the delivery system prior to combustion), including at the nozzles (as described in FIG. 12), to maintain the fuel in a liquid or supercritical state.

Alternatively, or in addition to altering the pressure of the fuel as described above, the temperature of the fuel can be modified as needed to maintain the fuel in a liquid or supercritical state. For example, as described above with respect to FIG. 4, fuel can bypass the thermal management system when the detected temperature exceeds the maximum temperature. In some embodiments, alternatively, or in addition to bypassing the thermal management system, the system can control the thermal input/output of the thermal management system to vary the amount of heat transferred to fuel engaging with the thermal management system. Thus, for example, when a maximum desired temperature is reached, a controller can cause the fuel to bypass the thermal management system and/or the controller can reduce an amount of thermal energy transferred to fuel engaging with the thermal management system (e.g., by reducing a thermal input to the one or more heat exchangers 98.

Figure 13:
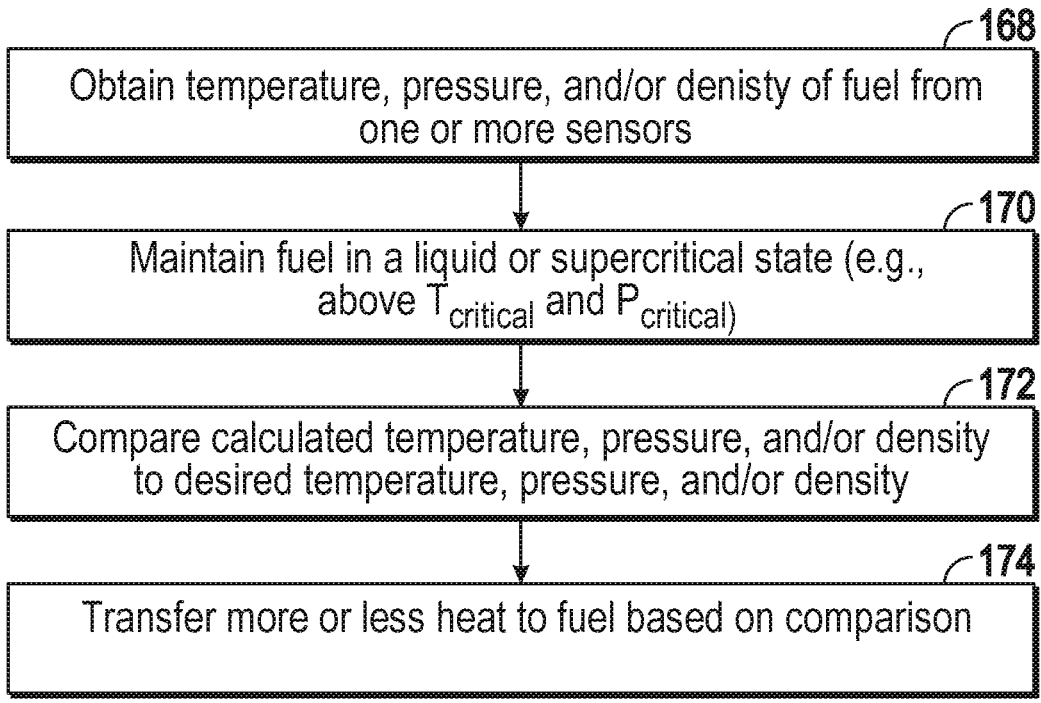
FIG. 13 is another flowchart illustrating an exemplary method of controlling fuel delivery of a gas turbine engine in accordance with an embodiment of the present disclosure.

FIG. 13 illustrates an exemplary system that can obtain temperature, pressure, and/or density information about the fuel from one or more sensors (step 168) and, based on this information, maintain the fuel in a liquid or supercritical state (step 170). For example, to maintain the fuel in the liquid or supercritical state, the fuel control system can control the amount of heat transferred to fuel based on a comparison of the information received by the sensors with a desired property of the fuel to maintain the fuel in a liquid or supercritical state.

Modifications of fuel based on temperature, pressure, and/or density, as described herein can similarly be achieved using calculations of variables closely related to those variables. For example, as the temperature of the fuel changes, the modulus of elasticity will similarly change. As a result, fuel properties can also be modified based on a calculated modulus of elasticity and/or a change in the calculated modulus of elasticity of the fuel, which includes a determination of the temperature of the fuel. Similarly, other parameters that are derived from temperatures, pressures, and/or densities may be used to control modifications to the fuel as described herein. For example, instead of (or in addition to) temperature, pressure, and/or density, determinations of kinematic viscosity, viscosity, volumetric flow, and specific volume can be used to identify changes in fuel states or approaching changes in fuel states. Thus, for example, a decrease in viscosity can be indicative of a change of a fuel from a liquid state to a gaseous state. Accordingly, such changes can be determined by the controller (e.g., through one or more sensors and/or one or more calculations) and more or less heat can be supplied to the fuel to maintain the fuel in the desired state (e.g., liquid, supercritical).

In some embodiments, the detection of an amount of change from a desired value and/or a current operating value of a parameter, by the controller, can be used to detect a change in fuel state (e.g., a change from a liquid state to a gaseous state). For example, in some embodiments, the determination of a change of 5% or more (e.g., 5%-10%, 5%-20%) from a desired or current operating condition (either an increase or decrease depending on the variable and the desired state of the fuel) of any one or more of the following variables can cause the controller to increase or decrease an amount of heat supplied to the fuel: temperature, pressure, modulus of elasticity, kinematic viscosity, viscosity, volumetric flow rate, and/or specific volume. For example, a 5% increase in fuel temperature can result in the controller reducing the amount of heat supplied to the fuel to maintain the fuel in the liquid state. In another embodiment, a 5% decrease in fuel temperature can result in the controller increasing an amount of heat supplied to the fuel to maintain the fuel in a supercritical state. Similarly, a 5% decrease in viscosity can result in the controller decreasing the amount of heat supplied to the fuel to maintain the fuel in the liquid state, while a 5% increase in viscosity can result in the controller increasing the amount of heat supplied to the fuel to maintain the fuel in the supercritical state.

In some embodiments, a nozzle flow number FN can be determined by $$FN := \frac{WF}{\sqrt{P_{fuel} - P_3}}$$

where WF is the fuel flow through the nozzle, $P_{fuel}$ is the fuel manifold pressure, and $P_3$ is combustor pressure. Changes in FN can be used to identify changes in fuel state. For example, in some embodiments, the determination of a change of 5% or more (e.g., 5%-10%, 5%-20%) from a desired or current operating FN can be indicative of a fuel state change (or approaching fuel state change) and the controller can be configured to increase or decrease an amount of heat supplied the fuel to adjust the fuel temperature as described herein.

Suitable controllers that can direct the system to increase or decrease temperatures, pressures, or other variables, based on feedback from the various sensors, are described in more detail below.

As discussed above, the fuel control system 106 can obtain temperature and pressure data of the fuel from one or more sensors (e.g., step 160) and, based on this information, maintain the fuel in a liquid state. For example, referring to FIG. 14, at a pressure above 150 psi, a temperature of the fuel can be maintained below 550° F. to avoid boiling of the fuel in the manifold and/or nozzle. In some embodiments, a temperature and pressure table can be stored by the fuel control system 106 and compared to temperatures and pressures obtained by the one or more sensors to determine if the temperature and/or pressure should be reduced or increased to avoid boiling of the fuel. In some embodiments, a maximum temperature and pressure can be a value selected to be below a boiling point of the fuel, such as a value that is at least 1% below the boiling temperature and/or pressure of the fuel, or in some embodiments, 1% and 10% below the boiling temperature and/or pressure of the fuel.

In general, the fuel control system 106 may comprise one or more processor-based devices, such as a given controller or computing device or any suitable combination of controllers or computing devices. Thus, in several embodiments, the fuel control system 106 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) of the computing system may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) may generally be configured to store suitable computer-readable instructions that, when implemented by the processor(s), configure the fuel control system 106 to perform various computer-implemented functions, such as one or more aspects of the methods and algorithms that will be described herein. In addition, the fuel control system 106 may also include various other suitable components, such as a communications circuit or module, one or more input/output channels, a data/control bus and/or the like.

In some embodiments, as discussed above, the fuel control system 106 is configured to receive data from various sensors to monitor, for example, temperatures, pressures, and/or flow rates of fuel. More specifically, during operation of the fuel delivery system, the fuel control system 106 is configured to receive data captured by the sensor 104 (e.g., via the communicative link indicated by the dashed lines). The fuel control system 106 is configured to process/analyze the received sensor data to determine and/or calculate values that the system can, in turn, use to direct other actions, such as opening/closing bypass valves or adjusting the fuel flow through the nozzle(s) 150. For example, fuel control system 106 may include a suitable look-up table stored within its memory device(s) that respectively correlates data received from the sensors and/or data calculated from the sensor data with one or more desired adjustments to fuel delivery based on the data received. For example, the look-up table may include boiling curve information (e.g., as shown in FIG. 14), supercritical temperature and pressure information (e.g., as shown in FIG. 3), or other such information as described herein.

Further aspects of the invention are provided by the subject matter of the following clauses:

1. A gas turbine engine fuel supply system comprising a fuel delivery system including a fuel source, a plurality of fuel lines, and at least one fuel pump; a thermal management system comprising at least one heat exchanger in engagement with a first portion of the plurality of fuel lines and configured to increase a temperature of the fuel in the first portion of the plurality of fuel lines; a fuel manifold downstream of the thermal management system and in fluid communication with a second portion of the plurality of fuel lines, the first portion and second portions being in fluid communication; one or more sensors positioned within the fuel manifold and/or second portion of the plurality of fuel lines, the one or more sensors being configured to identify one or more fuel parameters; a bypass system comprising one or more valves upstream of the first portion of the plurality of fuel lines and a third portion of the plurality of fuel lines that bypasses the thermal management system, the third portion of the plurality of fuel lines being in fluid communication with the second portion of the plurality of fuel lines; and a fuel control system that is configured to receive data indicative of the one or more fuel parameters and send a signal to the bypass system to open or close the one or more valves of the bypass system based on the received data from the one or more sensors.

2. The gas turbine engine fuel supply system of clause 1, wherein the one or more sensors comprise temperature sensors and the fuel parameters comprise temperatures of the fuel, and wherein the fuel control system is configured to compare the temperatures of the fuel from the one or more sensors with a predetermined maximum temperature and send a signal to the bypass system to open the one or more valves and direct fuel into the bypass system when the temperatures of the fuel from the one or more sensors exceeds the predetermined maximum temperature.

3. The gas turbine engine fuel supply system of clause 2, wherein the predetermined maximum temperature of the fuel is between 300° F. and 600° F.

4. The gas turbine engine fuel supply system of any one of the preceding clauses, wherein the one or more sensors comprise temperature and pressure sensors and the fuel parameters comprise temperatures and pressures of the fuel, and wherein the fuel control system is configured to: calculate a density of the fuel based on the fuel parameters received from the one or more sensors, compare the calculated density with a predetermined minimum allowable density, and send a signal to the bypass system to open the one or more valves and direct fuel into the bypass system when the calculated density of the fuel is less than the predetermined minimum allowable density.

5. The gas turbine engine fuel supply system of clause 4, wherein the predetermined minimum allowable density is between 70% and 95% of the density of the fuel as measured at 0° F.

6. The gas turbine engine fuel supply system of clause 4, wherein the predetermined minimum allowable density is between 80% and 88% of the density of the fuel as measured at 0° F.

7. The gas turbine engine fuel supply system of any one of the preceding clauses, wherein the one or more sensors comprise temperature and pressure sensors and the fuel parameters comprise temperatures and pressures of the fuel, and wherein the fuel control system is configured to: calculate a change in density of the fuel based on the fuel parameters received from the one or more sensors over a predetermined period of time, compare the change in density with a predetermined maximum allowable change in density, and send a signal to the bypass system to open the one or more valves and direct fuel into the bypass system when the calculated change in density of the fuel exceeds than the predetermined maximum allowable change in density.

8. A gas turbine engine fuel supply system comprising: a fuel delivery system including a fuel source, a plurality of fuel lines, and at least one fuel pump; a thermal management system comprising at least one heat exchanger in engagement with a first portion of the plurality of fuel lines and configured to increase a temperature of the fuel in the first portion of the plurality of fuel lines; a fuel manifold downstream of the thermal management system and in fluid communication with a second portion of the plurality of fuel lines, the first portion and second portions being in fluid communication; one or more sensors positioned within the fuel manifold and/or second portion of the plurality of fuel lines, the one or more sensors being configured to identify one or more fuel parameters; a bypass system comprising one or more valves upstream of the first portion of the plurality of fuel lines and a third portion of the plurality of fuel lines that bypasses the thermal management system, the third portion of the plurality of fuel lines being in fluid communication with the second portion of the plurality of fuel lines; and a fuel control system that is configured to receive data indicative of the one or more fuel parameters and send a signal to the thermal management system to increase or decrease an amount of heat transferred to the fuel based on the received data from the one or more sensors.

9. The gas turbine engine fuel supply system of clause 8, further comprising a bypass system comprising one or more valves upstream of the first portion of the plurality of fuel lines and a third portion of the plurality of fuel lines that bypasses the thermal management system, the third portion of the plurality of fuel lines being in fluid communication with the second portion of the plurality of fuel lines, wherein a controller of the fuel control system is configured to send a signal to the bypass system to open or close the one or more valves of the bypass system based on the received data from the one or more sensors.

10. The gas turbine engine fuel supply system of clause 8, wherein a controller of the fuel control system is configured to send a signal to the at least one heat exchanger to vary an amount of heat transferred to fuel passing through the at least one heat exchanger.

11. The gas turbine engine fuel supply system of clause 8, wherein the one or more sensors comprise temperature sensors and the fuel parameters comprise temperatures of the fuel, and wherein the fuel control system is configured to compare the temperatures of the fuel from the one or more sensors with a predetermined maximum temperature and the controller sends a signal to decrease an amount of heat transferred to the fuel when the temperature of fuel exceeds the predetermined maximum temperature.

12. The gas turbine engine fuel supply system of clause 11, wherein the predetermined maximum temperature of the fuel is between 300° F. and 600° F.

13. The gas turbine engine fuel supply system of clause 8, wherein the one or more sensors comprise temperature and pressure sensors and the fuel parameters comprise temperatures and pressures of the fuel, and wherein the fuel control system is configured to:

calculate a density of the fuel based on the fuel parameters received from the one or more sensors, compare the calculated density with a predetermined minimum allowable density, and send a signal to decrease an amount of heat transferred to the fuel when the calculated density of the fuel is less than the predetermined minimum allowable density.

14. The gas turbine engine fuel supply system of clause 13, wherein the predetermined minimum allowable density is between 70% and 95% of the density of the fuel as measured at 0° F.

15. The gas turbine engine fuel supply system of clause 13, wherein the predetermined minimum allowable density is between 80% and 88% of the density of the fuel as measured at 0° F.

16. The gas turbine engine fuel supply system of clause 8, wherein the one or more sensors comprise temperature and pressure sensors and the fuel parameters comprise temperatures and pressures of the fuel, and wherein the fuel control system is configured to:

calculate a change in density of the fuel based on the fuel parameters received from the one or more sensors over a predetermined period of time, compare the change in density with a predetermined maximum allowable change in density, and send a signal to decrease an amount of heat transferred to the fuel when the calculated density of the fuel is less than the predetermined minimum allowable density.

17. The gas turbine engine fuel supply system of clause 8, wherein the one or more sensors comprise temperature and pressure sensors and the fuel parameters comprise temperatures and pressures of the fuel, and wherein the fuel control system is configured to maintain the fuel at a temperature and pressure that is below the boiling point of the fuel by receiving the temperature and pressure of the fuel from the one or more sensors over a predetermined period of time and comparing the received temperature and pressure with a predetermined boiling point table and, changing a temperature or pressure of the fuel to avoid boiling of the fuel.

18. A gas turbine engine fuel supply system comprising a fuel delivery system including a fuel source, a plurality of fuel lines, and at least one fuel pump; a thermal management system comprising at least one heat exchanger in engagement with a first portion of the plurality of fuel lines and configured to increase a temperature of the fuel in the first portion of the plurality of fuel lines; a fuel manifold downstream of the thermal management system and in fluid communication with a second portion of the plurality of fuel lines, the first portion and second portions being in fluid communication; a plurality of variable pressure nozzles in fluid communication with the fuel manifold; one or more sensors positioned within the fuel manifold, the second portion of the plurality of fuel lines, and/or the variable pressure nozzles, the one or more sensors comprising at least one temperature sensor and at least one pressure sensor that identify a temperature and pressure of the fuel, respectively; and a fuel control system configured to receive data indicative of the temperature and pressure of the fuel from the one or more sensors, and adjust a temperature and/or pressure of the fuel based on the data received.

19. The gas turbine engine fuel supply system of clause 18, wherein the fuel control system is configured to determine if the fuel is in a supercritical state and modify the temperature and/or pressure of the fuel to maintain the fuel in the supercritical state.

20. The gas turbine engine fuel supply system of clause 19, wherein the fuel control system is configured to send a first signal to the thermal management system to increase a temperature of the fuel in the first portion if it is determined the fuel is not in a supercritical state.

21. The gas turbine engine fuel supply of clause 18, wherein the fuel control system is configured to compare the temperature and pressure of the fuel with a predetermined operable temperature and pressure; and send a second signal to increase or decrease the pressure of the fuel if it is determined the fuel is not in a supercritical state.

22. The gas turbine engine fuel supply of clause 21, wherein the second signal directs the plurality of variable pressure nozzles to increase or decrease a differential pressure of the plurality of variable pressure nozzles based on the comparison.

23. The gas turbine engine fuel supply of clause 21, wherein the second signal directs the at least one fuel pump to increase or decrease the pressure of the fuel in the fuel lines based on the comparison.

24. The gas turbine engine fuel supply system of clause 18, wherein the fuel control system is configured to send a first signal to the thermal management system to increase a temperature of the fuel in the first portion if it is determined the fuel is not in a supercritical state; compare the temperature and pressure of the fuel with a predetermined operable temperature and pressure; and send a second signal to the plurality of variable pressure nozzles to increase or decrease a differential pressure of the plurality of variable pressure nozzles based on the comparison.

25. The gas turbine engine fuel supply system of clause 18, wherein the fuel control system is configured to determine if the fuel is in a liquid state and modify the temperature and/or pressure of the fuel to maintain the fuel in the liquid state.

26. The gas turbine engine fuel supply system of clause 25, wherein the fuel control system is configured to compare the temperature of the fuel with a predetermined maximum allowable temperature, and send a signal to the bypass system to open the one or more valves and direct fuel into the bypass system when the temperature of the fuel is above than the predetermined maximum allowable temperature.

27. The gas turbine engine fuel supply system of clause 25, wherein the fuel control system is configured to compare the temperature and pressure of the fuel with predetermined boiling point data, and adjust the temperature and/or pressure of the fuel to maintain the fuel at a temperature and pressure below the boiling curve for the fuel.

28. The gas turbine engine fuel supply system of clause 25, wherein the fuel control system is configured to calculate a density of the fuel based on the fuel parameters received from the one or more sensors, compare the calculated density with a predetermined minimum allowable density, and send a signal to the bypass system to open the one or more valves and direct fuel into the bypass system when the calculated density of the fuel is less than the predetermined minimum allowable density.

29. The gas turbine engine fuel supply system of clause 28, wherein the predetermined minimum allowable density is between 70% and 95% of the density of the fuel as measured at 0° F.

30. The gas turbine engine fuel supply system of clause 28, wherein the predetermined minimum allowable density is between 80% and 88% of the density of the fuel as measured at 0° F.

31. A method of controlling a fuel supply system of a gas turbine engine of an aircraft comprising delivering a jet fuel from a fuel source through a plurality of fuel lines by one or more pumps; determining one or more fuel parameters by obtaining data from one or more sensors positioned within a fuel manifold and/or one or more locations with the plurality of fuel lines; and adjusting a temperature and/or pressure of the fuel based on the determined fuel parameters to maintain the fuel in a liquid or supercritical state.

32. The method of clause 31, wherein the one or more sensors comprise temperature sensors and the one or more fuel parameters comprise the temperature of the fuel.

33. The method of either one of clauses 31 and 32, wherein the one or more sensors comprise pressure sensors and the one or more fuel parameters comprise the pressure of the fuel.

34. The method of any one of clauses 31-33, wherein adjusting the temperature or pressure of the fuel comprises opening one or more valves to bypass at least one heat exchanger of a thermal management system.

35. The method of any one of clauses 31-34, wherein adjusting the temperature or pressure of the fuel comprises adjusting an amount of heat supplied by at least one heat exchanger of a thermal management system to the fuel.

36. The method of any one of clauses 31-35, wherein adjusting the temperature or pressure of the fuel comprises adjusting a pressure of the fuel by changing a pump pressure and/or adjusting a pressure at a nozzle system.

37. The method of any one of clauses 31-36, wherein the one or more fuel parameters comprise one or more of a pressure, temperature, density, modulus of elasticity, kinematic viscosity, viscosity, volumetric flow rate, and specific volume of the fuel.

38. The method of clause 37, further comprising determining a percentage of change of the one or more fuel parameters and adjusting a temperature and/or pressure of the fuel if the percentage of change is 5% or greater.

39. The method of any one of clauses 31-36, further comprising determining a percentage of change of a nozzle flow number, and adjusting a temperature and/or pressure of the fuel if the percentage of change is 5% or greater.

40. The method of clause 31, wherein the one or more sensors provide data sufficient to determine the fuel parameter.

41. The method of clause 40, wherein the fuel parameter comprises at least one of a modulus of elasticity, a nozzle flow number, a kinematic viscosity, a viscosity, a volumetric flow, and a specific volume.

42. The method of any one of clauses 40-41, wherein the fuel parameter is calculated from the data provided by the one or more sensors.

43. The method of clause 42, wherein the fuel parameter is calculated using a lookup table.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of controlling a fuel supply system of a gas turbine engine of an aircraft, the fuel supply system comprising:
   a fuel delivery system including a fuel source, a plurality of fuel lines, and at least one fuel pump;
   a thermal management system comprising at least one heat exchanger in engagement with a first portion of the plurality of fuel lines and configured to increase a temperature of a fuel in the first portion of the plurality of fuel lines;
   a fuel manifold downstream of the thermal management system and in fluid communication with a second portion of the plurality of fuel lines, the first portion and the second portion being in fluid communication:
   one or more sensors positioned within the fuel manifold and/or the second portion of the plurality of fuel lines. the one or more sensors being configured to identify one or more fuel parameters;
   a fuel control system that is configured to receive data indicative of the one or more fuel parameters and determine whether the fuel is in a supercritical state based on the received data; and
   a combustion section with a plurality of variable pressure nozzles,
   wherein the one or more sensors comprise temperature and pressure sensors, the fuel parameters comprise temperatures and pressures of the fuel, and the fuel control system is configured to maintain the fuel in the supercritical state by adjusting the pressure and/or the temperature of the fuel based on the received data and determination of whether the fuel is in the supercritical state, wherein the fuel control system is further configured to maintain the fuel in the supercritical state by controlling the plurality of variable pressure nozzles to alter a differential pressure of the plurality of variable pressure nozzles to increase the pressure of the fuel to maintain the fuel in the supercritical state, the method comprising:

delivering fuel from the fuel source through the plurality of fuel lines by the at least one fuel pump;

determining the one or more fuel parameters; and adjusting the temperature and/or the pressure of the fuel based on the determined fuel parameters to maintain the fuel in the supercritical state.

2. The method of claim 1, wherein adjusting the temperature and/or the pressure of the fuel comprises opening one or more valves to bypass the at least one heat exchanger of the thermal management system.

3. The method of claim 1, wherein adjusting the temperature and/or the pressure of the fuel comprises adjusting an amount of heat supplied by the at least one heat exchanger of the thermal management system to the fuel.

4. The method of claim 1, wherein adjusting the temperature and/or the pressure of the fuel comprises adjusting the pressure of the fuel by changing a pump pressure of the at least one fuel pump.

5. The method of claim 1, further comprising delivering the fuel to the combustion section via the plurality of variable pressure nozzles.

6. The method of claim 5, further comprising controlling the plurality of variable pressure nozzles are controlled to adjust the temperature and/or the pressure of the fuel to maintain the fuel in the supercritical state.

7. The method of claim 5, wherein an exit area of one or more of the plurality of variable pressure nozzles can be increased or decreased to maintain the fuel in the supercritical state.

8. The method of claim 5, further comprising adjusting the differential pressure of one or more of the plurality of variable pressure nozzles to maintain the fuel in the supercritical state.

9. The method of claim 5, wherein the plurality of variable pressure nozzles comprise one or more groups of nozzles that can be independently controlled to increase or decrease the pressure of the fuel at the plurality of variable pressure nozzles to maintain the fuel in the supercritical state.

10. The method of claim 1, wherein the fuel control system determines if the fuel is in the supercritical state by comparing data from the one or more sensors to one or more look-up tables that are stored by the fuel control system.

11. A gas turbine engine fuel supply system comprising:

a fuel delivery system including a fuel source, a plurality of fuel lines, and at least one fuel pump;

a thermal management system comprising at least one heat exchanger in engagement with a first portion of the plurality of fuel lines and configured to increase a temperature of a fuel in the first portion of the plurality of fuel lines;

a fuel manifold downstream of the thermal management system and in fluid communication with a second portion of the plurality of fuel lines, the first portion and the second portion being in fluid communication;

one or more sensors positioned within the fuel manifold and/or the second portion of the plurality of fuel lines, the one or more sensors being configured to identify one or more fuel parameters;

a fuel control system that is configured to receive data indicative of the one or more fuel parameters and determine whether the fuel is in a supercritical state based on the received data; and a combustion section with a plurality of variable pressure nozzles, wherein the one or more sensors comprise temperature and pressure sensors, the fuel parameters comprise temperatures and pressures of the fuel, and the fuel control system is configured to maintain the fuel in the supercritical state by adjusting the pressure and/or the temperature of the fuel based on the received data and determination of whether the fuel is in the supercritical state, wherein the fuel control system is further configured to maintain the fuel in the supercritical state by controlling the plurality of variable pressure nozzles to alter a differential pressure of the plurality of variable pressure nozzles to increase the pressure of the fuel to maintain the fuel in the supercritical state.

12. The gas turbine engine fuel supply system of claim 11, wherein the fuel control system is configured to send one or more signals to the thermal management system to increase or decrease an amount of heat transferred to the fuel by the at least one heat exchanger to maintain the fuel in the supercritical state based on the received data from the one or more sensors.

13. The gas turbine engine fuel supply system of claim 11, further comprising:

a bypass system comprising one or more valves upstream of the first portion of the plurality of fuel lines and a third portion of the plurality of fuel lines that bypasses the thermal management system, the third portion of the plurality of fuel lines being in fluid communication with the second portion of the plurality of fuel lines, wherein, to maintain the fuel in the supercritical state in the fuel manifold, the fuel control system is configured to send a signal to the bypass system to open or close the one or more valves of the bypass system based on the received data from the one or more sensors.

14. The gas turbine engine fuel supply system of claim 11, wherein the one or more sensors are positioned within the second portion of the plurality of fuel lines and the fuel control system is configured to send one or more signals to the thermal management system to increase an amount of heat transferred to the fuel by the at least one heat exchanger to maintain the supercritical state of the fuel within the second portion of the plurality of fuel lines.

15. The gas turbine engine fuel supply system of claim 11, wherein the one or more sensors are positioned within the fuel manifold and the fuel control system is configured to send one or more signals to the thermal management system to increase the pressure of the fuel to maintain the supercritical state of the fuel within the fuel manifold.

16. The gas turbine engine fuel supply system of claim 14, wherein the thermal management system is configured to increase the pressure of the fuel in the fuel manifold by increasing the pressure of the at least one fuel pump.

17. The gas turbine engine fuel supply system of claim 11, wherein the one or more sensors are positioned within the second portion of the plurality of fuel lines and the fuel control system is configured to send one or more signals to the thermal management system to increase the pressure of the fuel to maintain the supercritical state of the fuel with the second portion of the plurality of fuel lines.

18. The gas turbine engine fuel supply system of claim 14, wherein the thermal management system is configured to increase the pressure of the fuel in the second portion of the plurality of fuel lines by increasing the pressure at the at least one fuel pump.

19. The gas turbine engine fuel supply system of claim 11, wherein the fuel control system determines if the fuel is in the supercritical state by comparing the received data to one or more look-up tables that are stored by the fuel control system.

\* \* \* \* \*